United States Patent [19]

Kane et al.

[11] 3,901,775
[45] Aug. 26, 1975

[54] METHOD OF OCEAN FLOOR NODULE TREATMENT AND ELECTROLYTIC RECOVERY OF METALS

[75] Inventors: William S. Kane, Newport News; Paul H. Cardwell, Zanoni, both of Va.

[73] Assignee: Deepsea Ventures, Inc., Gloucester Point, Va.

[22] Filed: Dec. 18, 1972

[21] Appl. No.: 315,878

Related U.S. Application Data

[63] Continuation of Ser. No. 40,590, May 26, 1970, abandoned, and a continuation-in-part of Ser. No. 40,564, May 26, 1970, abandoned.

[52] U.S. Cl. ............. 204/105 M; 204/107; 204/113; 204/64; 75/101 BE; 75/111; 75/117; 75/119; 75/121; 423/140; 423/633
[51] Int. Cl. ........ C22d 1/24; C22d 1/14; C22d 1/16
[58] Field of Search ....... 204/105 M, 105, 107, 113, 204/39, 64; 75/101 BE, 114, 117, 119, 121, 111; 423/140, 633

[56] References Cited
UNITED STATES PATENTS 3,707,448   12/1972   Veloso et al. .................. 204/105 M
3,751,745   8/1973   Kane et al. ..................... 204/105 M

*Primary Examiner*—R. L. Andrews
*Attorney, Agent, or Firm*—Barry G. Magidoff

[57] ABSTRACT

Method of recovering metal values from ocean floor nodules of the type containing iron, manganese, copper, cobalt, and nickel, comprising grinding the nodules into particles and mixing with a chloride-forming medium so as to obtain metal chlorides as reaction products, including vaporizing the metal chlorides into fractions, converting the iron chloride in the fractions containing iron chloride to iron oxide, directly subjecting the manganese chloride fraction to fused salt electrolysis, leaching an iron oxide-copper chloride fraction, removing iron oxide and electrolyzing so as to obtain copper value, leaching the mixture of nickel, cobalt, and manganese chlorides, and separating the nickel chloride and cobalt chloride by liquid ion exchange and electrolyzing separately, then crystallizing any remaining manganese chloride and electrolyzing.

8 Claims, 5 Drawing Figures

NODULE + NaCl + H₂SO₄ (100% OF THEORETICAL) + COAL (10% OF THEORETICAL) TEMP. 950°C, Cl₂ FLOW - 1850 ML/MIN

NODULE + HCl, TIME 4 HOURS, FLOW - 1600 ML/MIN

NODULE   Cl₂ FLOW 600ML/MIN

NODULE + H₂SO₄ + NaCl + HCl, HCl FLOW - 1600 ML/MIN

INVENTORS
WILLIAM S. KANE
PAUL H. CARDWELL

BY David H. Semmes
ATTORNEY

METHOD OF OCEAN FLOOR NODULE TREATMENT AND ELECTROLYTIC RECOVERY OF METALS

CROSS-REFERENCES TO RELATED APPLICATIONS:

This is a continuation of application Ser. No. 040,590, filed May 26, 1970, and a continuation-in-part of METHOD OF RECOVERING METAL VALUES FROM OCEAN FLOOR NODULES, Ser. No. 40,564, filed May 26, 1970. Both applications are now abandoned.

The present application is distinguished in that the manganese nodules are chlorinated to produce vapors of the metal chlorides and chlorine gas.

BACKGROUND OF THE INVENTION

1. Field of the Invention

A great deal of recent attention has been directed to the harvesting of ocean floor nodules and extraction of their principal metal values including manganese, copper, cobalt, and nickel. Earlier inventors have attempted removal of one or more of these metal values but, apparently, have been unable to isolate and remove selectively the manganese, copper, cobalt, and nickel values. Also, industries have hydrochlorinated ores so as to remove nickel, cobalt, and manganese. However, these processes have been mostly restricted to removal of one or, at the most, two of these metals, the raffinate or residue solution having been discarded as waste.

2. SUMMARY OF THE INVENTION

The nodules are treated by grinding and mixing with a chloride-producing agent, then heated so as to form as vaporized reaction products: iron chloride, manganese chloride, nickel chloride, cobalt chloride, and copper chloride. A carrier gas is flowed against the reaction mass to remove the vaporized reaction products and condense them into fractions. The manganese chloride is directly subjected to fused salt electrolysis. The iron chloride-containing fraction is separated from copper chloride by reacting with air to form iron oxide, and the copper chloride is subjected to electrolysis. The remaining nickel, cobalt, and manganese chlorides are leached and the nickel and cobalt extracted by liquid ion exchange prior to electrolyzing. The raffinate containing manganese is evaporated to produce manganese chloride which is subjected to fused salt electrolysis.

DESCRIPTION OF THE PREFERRED EMBODIMENTS

The nodules are mixed with sodium chloride and sulfuric acid and heated to 700° to 1,100° C. to form and to vaporize the chlorides of iron, manganese, nickel, cobalt, and copper along with minor impurities. In place of sulfuric acid, sulfur trioxide or a mixture of sulfur trioxide and water can be used. Also, in place of sodium chloride and sulfuric acid, hydrogen chloride can be used. It is, also, possible to use other chlorides than sodium chloride. At times, it is desirable to use potassium chloride and form as the by-product potassium sulfate. Any chloride which will react with sulfuric acid to form hydrogen chloride can be used, such as calcium chloride.

The carrier gas to remove the metal chlorides from the reaction mass is usually chlorine since it is a by-product of the reaction. Other gases can be used such as hydrogen chloride, air, nitrogen, oxygen, water, and carbon dioxide.

Once the metal chlorides are vaporized, this process is the same as the chlorination process disclosed in applicants' earlier-filed application entitled PROCESSING OF MANGANESE NODULES FROM THE OCEAN FLOOR FOR METAL VALUES, Ser. No. 40,587, filed May 26, 1970, now U.S. Pat. No. 3,867,007.

Figure 1:
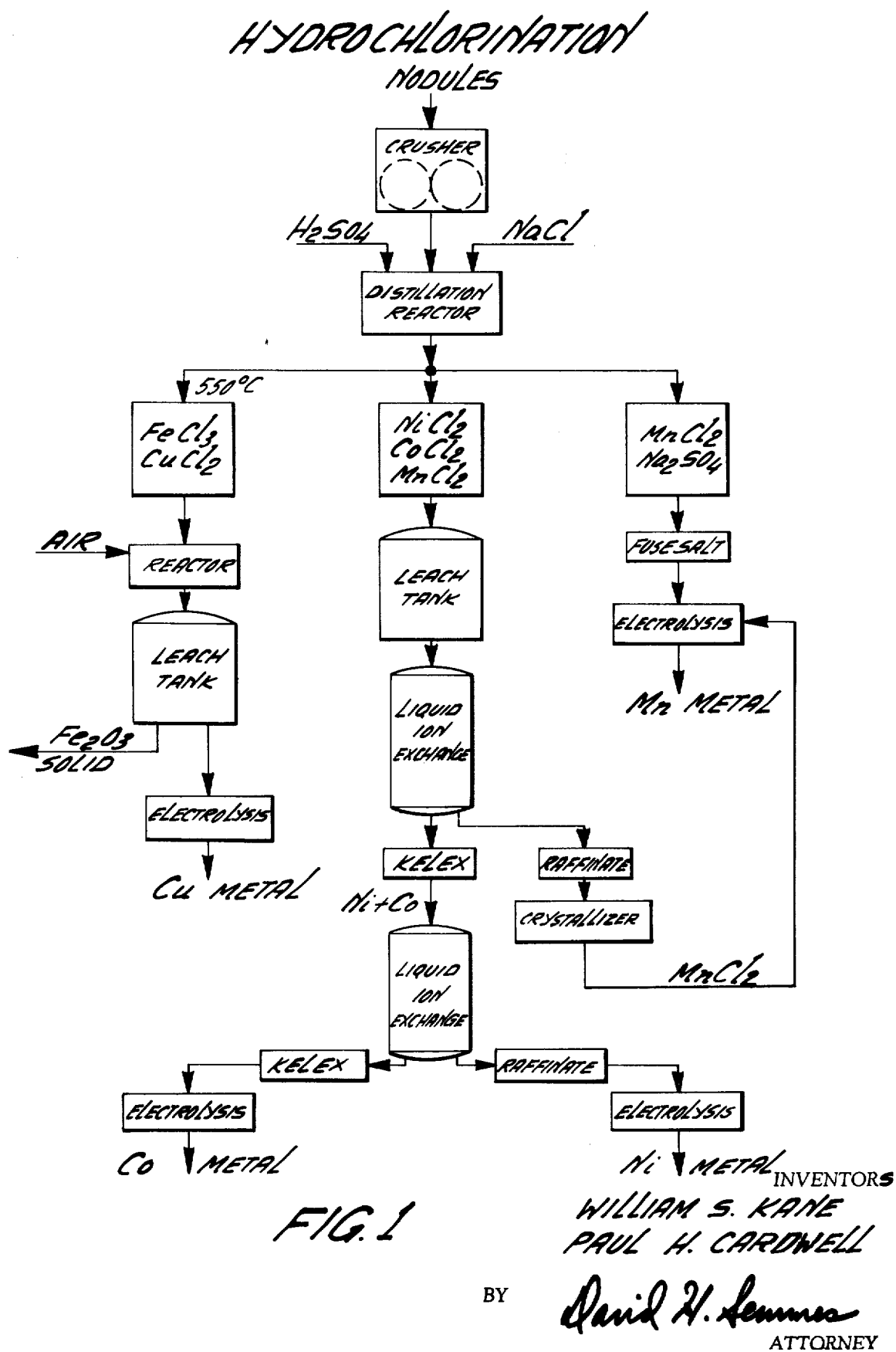
FIG. 1 is a flow sheet depicting the present process.
Figure 2:
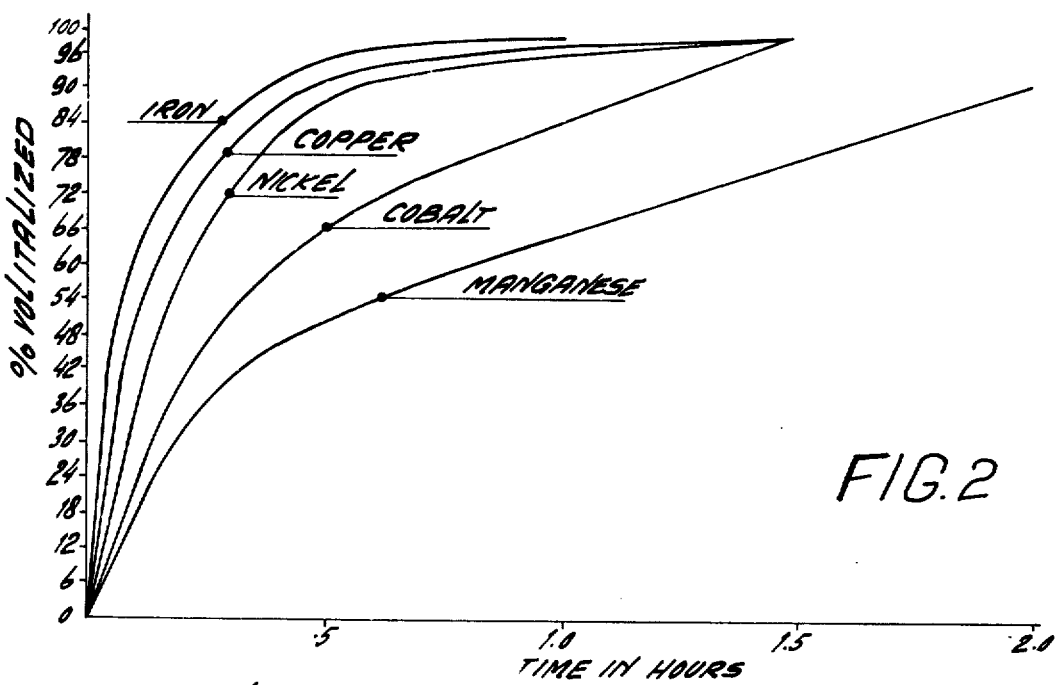
FIG. 2 is a chart showing the volatization of the chlorides when treating the nodules with hydrogen chloride and chlorine.

The vaporization of the metal chlorides from the nodules is given in the attached graph curves:

FIG. 2 — Nodule with sulfuric acid chloride as the carrier gas. Test time was 4 hours and hydrogen chloride flow rate was 16 mls/min.

Figure 3:
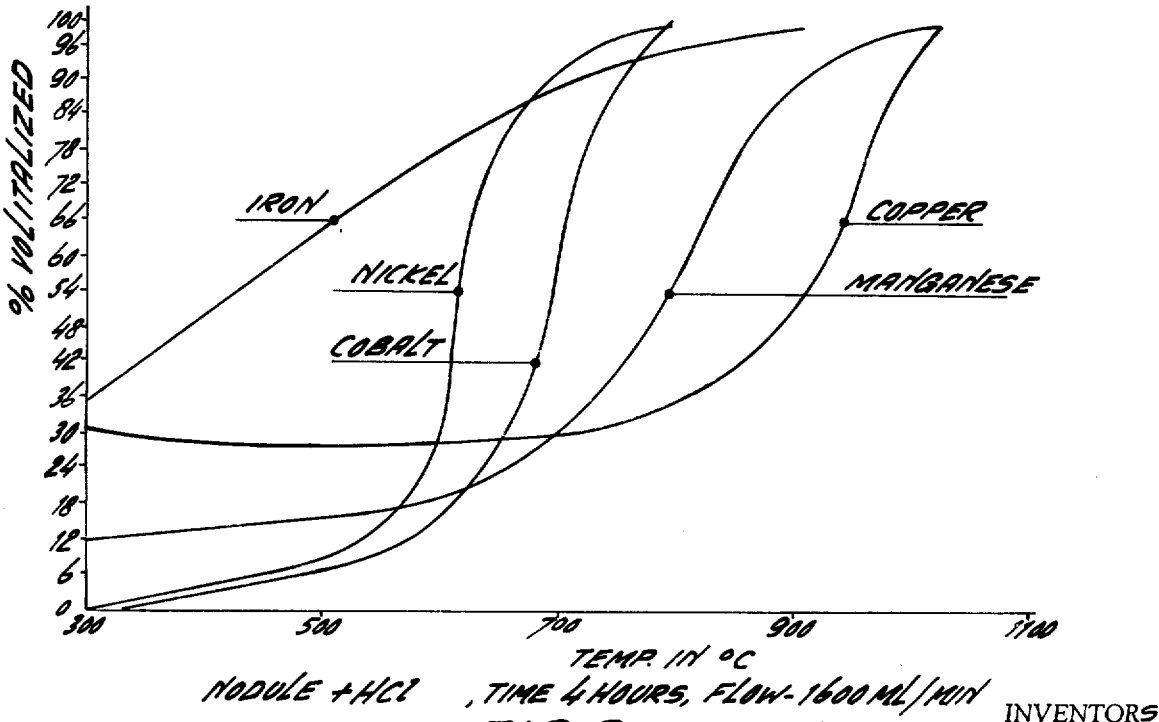
FIG. 3 is a chart showing the volatization of the metal chlorides when treating the nodules with hydrogen chloride.

FIG. 3 — Nodule with hydrogen chloride and chlorine. Test time was 4 hours and the flow rates were for hydrogen chloride 1600 mls/min. and for chlorine 600 mls/min.

Figure 4:
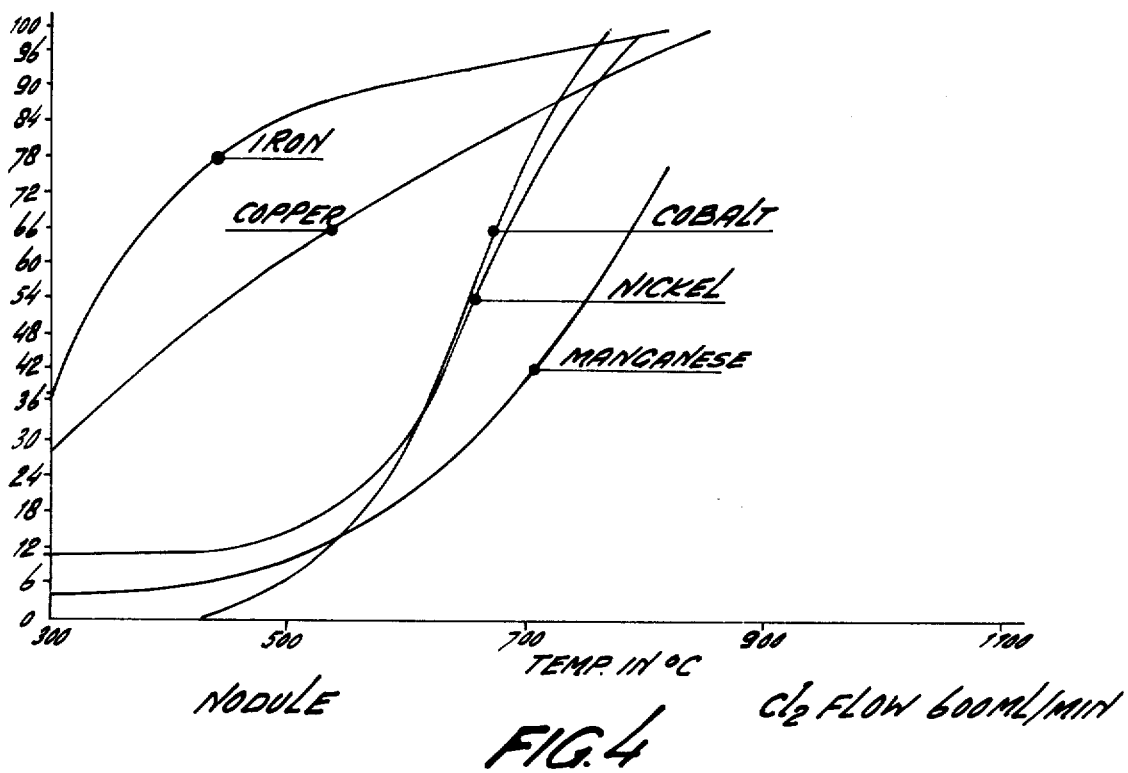
FIG. 4 is a graph showing the volatization of the metal chlorides when treating the nodules with sodium chloride and sodium sulfate and coal.

FIG. 4 — Nodule with hydrogen chloride. Contact time was 4 hours and the hydrogen chloride flow rate was 1600 mls/min.

Figure 5:
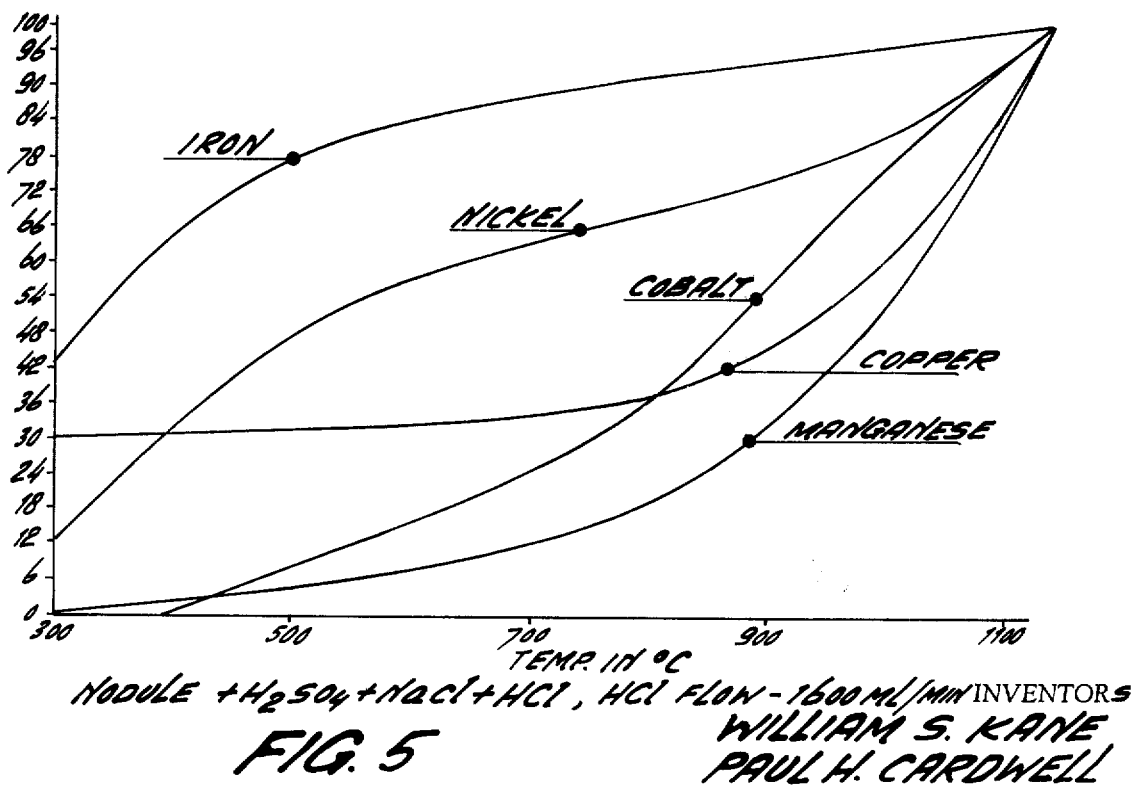
FIG. 5 is a chart showing the volatization of the metal chlorides when treating the nodules with sulfuric acid, sodium chloride, and hydrogen chloride.

FIG. 5 — Nodule with sulfuric acid and sodium chloride using chlorine as the carrier gas. Temperature of the test was 950° C. and the chlorine flow rate was 1850 mls/min.

As in applicants' co-pending application entitled PROCESSING OF MANGANESE NODULES FROM THE OCEAN FLOOR FOR METAL VALUES, Ser. No. 40,587 filed May 26, 1970, the reaction products may be vaporized into fractions, depending upon the temperatures employed during heating. Similarly, all reaction products may be vaporized simultaneously, yet condensed fractionally. Those vaporized reaction products which are condensed as mixtures are leached with water and the individual metal chlorides separated by a liquid ion exchange reagent such as Kelex, as in the parent application, or Lix.

Instead of flowing water vapor, the reaction products may be leached with water, so as to obtain a pregnant leach liquor. Then, the leach liquor may be injected with caustic so as to convert iron chloride to iron oxide. If there is ferrous iron present, air may be introduced into the pregnant leach liquor to form iron oxide.

We claim:

1. Method of ocean floor nodule treatment, comprising:

A. mixing said nodules with sulfuric acid and a chloride from the group consisting of those chlorides which react with sulfuric acid to form hydrogen chloride;

B. heating, so as to form as vaporized reaction products:
 i. iron chloride;
 ii. manganese chloride;
 iii. nickel chloride;
 iv. cobalt chloride;
 v. copper chloride C. flowing a carrier gas against the reaction mass, so as to remove said vaporized reaction products;

D. obtaining an aqueous, leach solution comprising dissolved, water-soluble chlorides of nickel, copper, manganese and cobalt, substantially free from iron, by the following steps carried out in any chronological order; (i) condensing said reaction products; (ii) converting the iron chloride to water-insoluble iron oxide; and (iii) leaching the metal chlorides with water to form an aqueous solution of the metal chlorides;

E. separating the aqueous solution from the insoluble iron oxide;

F. extracting said metal chlorides from the aqueous solution by liquid ion exchange reagent, and separately stripping individual metal chlorides;

G. cathodically electroplating to obtain said copper, cobalt and nickel values in separate aqueous electrolytic cells; and, H. drying the stripped manganese chloride, melting and electrowinning of said manganese values in a fused salt electrolytic cell.

2. The method of ocean floor nodule treatment as in claim 1, wherein the iron chloride is converted to iron oxide by contacting the iron chloride with flowing water vapor so as to form iron oxide and separating the iron oxide from the solution by filtration.

3. Method of ocean floor nodule treatment as in claim 1, wherein said chloride is calcium chloride.

4. Method of ocean floor nodule treatment as in claim 1, wherein said chloride is sodium chloride.

5. Method of processing ocean floor nodules as in claim 1, wherein said heating is at various levels, so as to vaporize said reaction products in fractions.

6. Method of processing ocean floor nodules for metal values as in claim 1, wherein said condensing is in fractions substantially as follows:
 i. manganese chloride;
 ii. nickel chloride and cobalt chloride; and
 iii. iron chloride and copper chloride.

7. Method of processing ocean floor nodules for metal values as in claim 1, wherein said condensing is in fractions substantially as follows:
 i. manganese chloride; and
 ii. mixtures of other metal chlorides.

8. Method of processing ocean floor nodules for metal values as in claim 1, wherein said condensing is in fractions substantially as follows:
 i. iron chloride; and
 ii. mixtures of other metal chlorides.

* * * * *